(12) United States Patent
Nagasawa

(10) Patent No.: US 11,560,109 B2
(45) Date of Patent: Jan. 24, 2023

(54) AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/690,152

(22) Filed: Mar. 9, 2022

(65) Prior Publication Data

US 2022/0306028 A1 Sep. 29, 2022

(30) Foreign Application Priority Data

Mar. 29, 2021 (JP) .............................. JP2021-054690

(51) Int. Cl.
*B60R 21/0134* (2006.01)
*B60R 21/36* (2011.01)

(52) U.S. Cl.
CPC .......... *B60R 21/0134* (2013.01); *B60R 21/36* (2013.01)

(58) Field of Classification Search
CPC .............................. B60R 21/0134; B60R 21/36
See application file for complete search history.

(56) References Cited

U.S. PATENT DOCUMENTS

| 6,883,631 B2 * | 4/2005 | Hu ........................ B60R 21/013 |
| | | 180/274 |
| 7,416,043 B2 * | 8/2008 | Pipkorn .................. B60R 19/36 |
| | | 180/274 |
| 7,954,587 B2 * | 6/2011 | Kisanuki ................. B60R 21/36 |
| | | 180/274 |
| 2006/0169517 A1 | 8/2006 | Mishra |
| 2006/0186702 A1 | 8/2006 | Kisanuki et al. |

FOREIGN PATENT DOCUMENTS

| JP | H08318799 A | * 12/1996 | ......... B60R 21/0134 |
| JP | 2006-219119 A | 8/2006 | |
| JP | 2008-526593 A | 7/2008 | |

* cited by examiner

*Primary Examiner* — Faye M Fleming
(74) *Attorney, Agent, or Firm* — McGinn I.P. Law Group, PLLC.

(57) ABSTRACT

An airbag apparatus to be applied to a vehicle includes airbags, a pre-crash determiner, an airbag deployment controller, and an airbag contraction controller. The airbags are configured to be deployed forward of a vehicle body front of the vehicle, and are disposed in a vehicle width direction. The pre-crash determiner is configured to establish a pre-crash determination when a probability of a collision with an object is a predetermined value or higher. The airbag deployment controller is configured to deploy the airbags in response to establishment of the pre-crash determination. The airbag contraction controller is configured to control contraction of the airbags individually, and perform side airbag contraction control by contracting one of the airbags that is on one side in the vehicle width direction and in a region where the collision with the object is occurring, and keeping deployed another one or more of the airbags in the region.

9 Claims, 5 Drawing Sheets

FORWARD OF VEHICLE

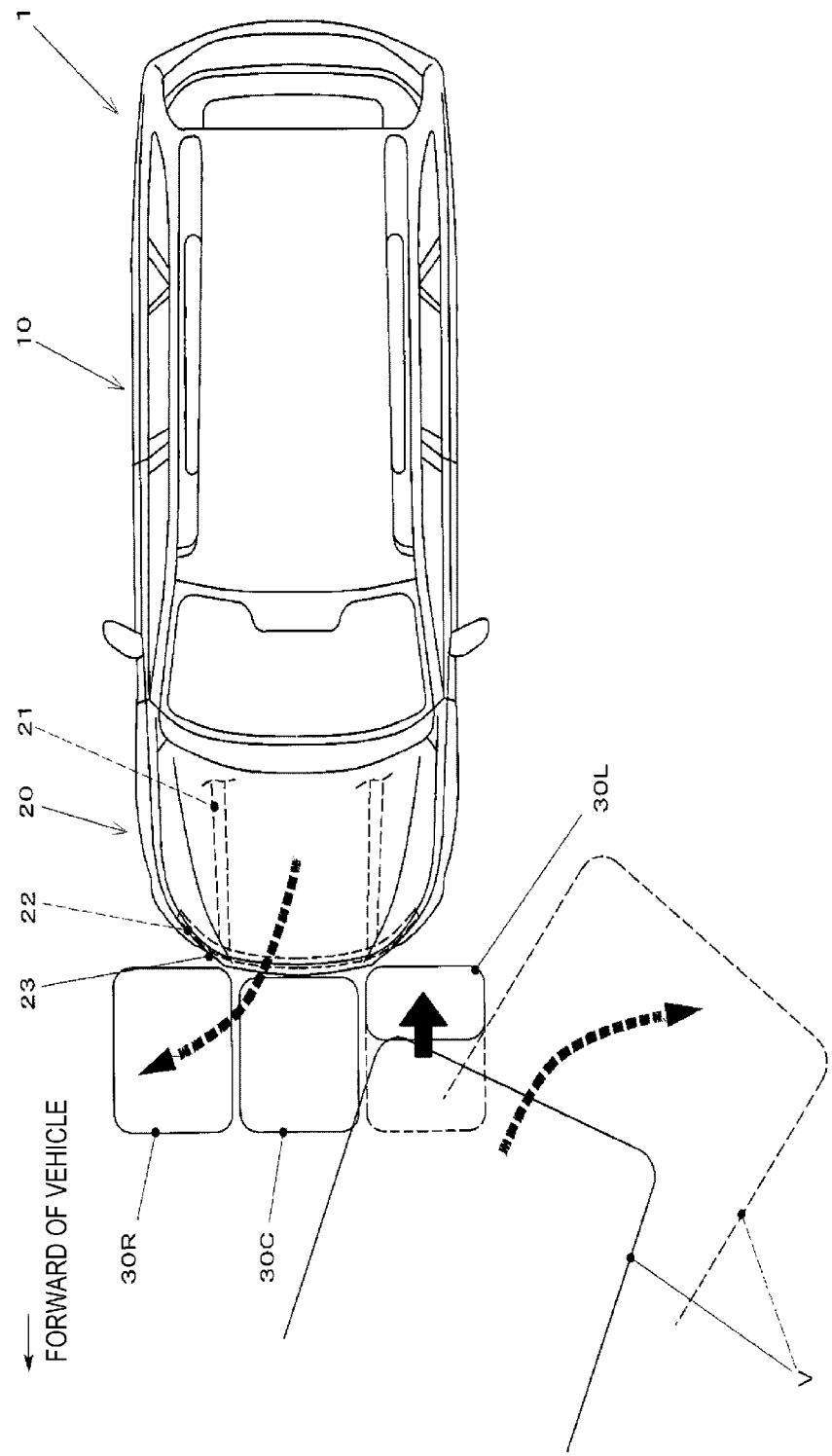

AIRBAG APPARATUS

CROSS-REFERENCE TO RELATED APPLICATIONS

The present application claims priority from Japanese Patent Application No. 2021-054690 filed on Mar. 29, 2021, the entire contents of which are hereby incorporated by reference.

BACKGROUND

The disclosure relates to an airbag apparatus including airbags deployable outward from a vehicle body front of a vehicle such as an automobile.

As a technique regarding an airbag apparatus deployable out of a vehicle such as an automobile, for example, Japanese Unexamined Patent Application Publication No. 2006-219119 discloses use of a plurality of airbags, which are deployable in front of a front bumper and disposed in a vehicle width direction. In the event of a collision of the vehicle with a pedestrian or the like, the airbags serve to prevent the pedestrian or the like that has been bumped up from falling down and injuring the head and face, for example.

Japanese Unexamined Patent Application Publication (Translation of PCT Application) (JP-T) No. 2008-526593 discloses that a plurality of airbags are deployed around a vehicle body so as to prevent damage to the vehicle body during a collision.

SUMMARY

An aspect of the disclosure provides an airbag apparatus to be applied to a vehicle. The airbag apparatus includes airbags, a pre-crash determiner, an airbag deployment controller, and an airbag contraction controller. The airbags are configured to be deployed forward of a vehicle body front of the vehicle. The airbags are disposed in a vehicle width direction. The pre-crash determiner is configured to establish a pre-crash determination in a case where a probability of a collision with an object is equal to or higher than a predetermined value. The airbag deployment controller is configured to deploy the airbags in response to establishment of the pre-crash determination. The airbag contraction controller is configured to control contraction of the airbags individually. The airbag contraction controller is configured to perform side airbag contraction control by contracting one of the airbags in a region where the collision with the object is occurring, and keeping deployed another one or more of the airbags in the region. The one of the airbags is on one side in the vehicle width direction.

An aspect of the disclosure provides an airbag apparatus to be applied to a vehicle. The airbag apparatus includes airbags and circuitry. The airbags are configured to be deployed forward of a vehicle body front of the vehicle. The airbags are disposed in a vehicle width direction. The circuitry is configured to establish a pre-crash determination in a case where a probability of a collision with an object is equal to or higher than a predetermined value. The circuitry is configured to deploy the airbags in response to establishment of the pre-crash determination. The airbag contraction controller is configured to control contraction of the airbags individually. The circuitry is configured to perform side airbag contraction control by contracting one of the airbags in a region where the collision with the object is occurring, and keeping deployed another one or more of the airbags in the region. The one of the airbags is on one side in the vehicle width direction.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 5 is a diagram illustrating a state after the vehicle including the airbag apparatus according to the embodiment has collided with the other vehicle and performed side airbag contraction control.

DETAILED DESCRIPTION

In general, a vehicle such as an automobile is designed considering absorption of collision energy by collapsing a front structure of a vehicle body upon a frontal collision.

As disclosed in JP-T No. 2008-526593, even when the airbags are deployed out of the vehicle, a load received by the airbags is normally transmitted to structural members of the vehicle body, and collision energy not absorbed by the airbags is absorbed by collapsing the vehicle structure.

In many cases, such energy absorption is on the assumption that another vehicle that has collided with the host vehicle has substantially the same vehicle weight as the host vehicle, and that the collision occurs at a relative speed of several tens of kilometers per hour, for example.

Actually, however, there is a possibility of occurrence of a collision with a vehicle larger than the host vehicle, a collision with a vehicle at a higher speed than a presumed vehicle speed, and a multiple collision with a plurality of vehicles in succession, for example. Then, sufficient energy absorption may not be achieved only by collapsing the vehicle body structure.

Therefore, there has been a demand for mitigating damage during a collision without excessively depending on the vehicle body structure.

It is desirable to provide an airbag apparatus that makes it possible to mitigate damage during a collision with an object.

Hereinafter, a description will be made on an airbag apparatus according to an embodiment of the disclosure. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The airbag apparatus according to the embodiment is disposed, for example, on a front of a vehicle body of an automobile such as a passenger vehicle so as to mitigate damage during a collision with an object such as another vehicle.

Figure 1:
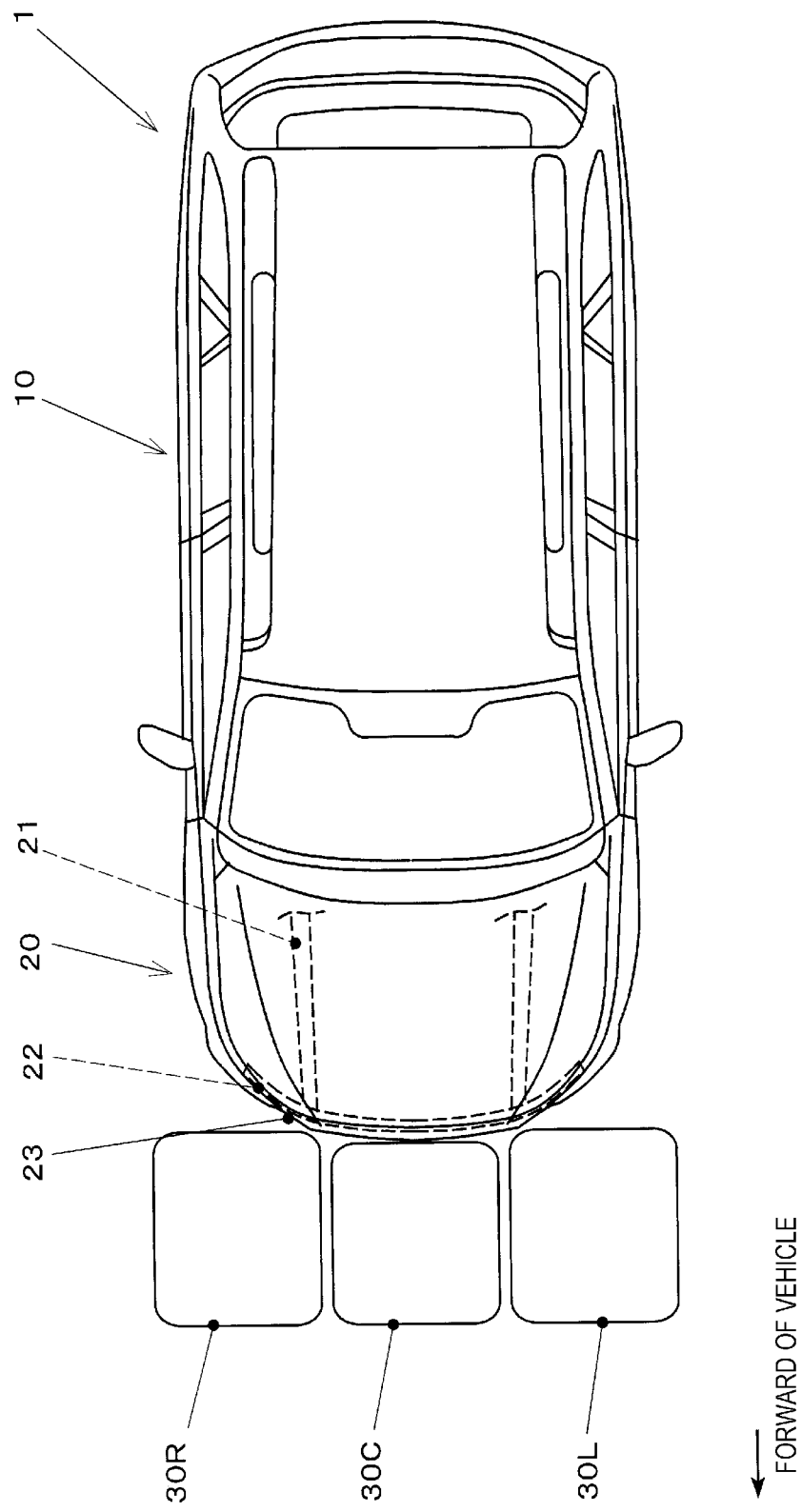
FIG. 1 is a diagram schematically illustrating a configuration of an airbag apparatus according to an embodiment of the disclosure.

FIG. 1 is a diagram schematically illustrating a configuration of the airbag apparatus according to the embodiment.

FIG. 1 illustrates a state of a vehicle including the airbag apparatus according to the embodiment, as viewed from above.

The vehicle 1 has, for example, a so-called two-box vehicle shape including an engine compartment 20 that protrudes forward from a vehicle cabin 10.

The vehicle cabin 10 has a space that accommodates an occupant, for example.

The engine compartment 20 has a space that accommodates power train components such as an engine, a transmission, a motor-generator in the case of an electric vehicle, and control units for these components.

The engine compartment 20 includes front side frames 21, a bumper beam 22, a front bumper 23, and other components.

The front side frames 21 are structural members protruding toward the front of the vehicle from a toeboard, not illustrated, which is a partition wall disposed on a front end of the vehicle cabin 10.

The front side frames 21 serve, for example, as cross members where a power train and a front suspension are attached, and as a base portion where a component such as a strut housing accommodating struts of a MacPherson-strut front suspension is attached.

For example, a steel plate is molded into components by presswork, and the components are gathered and welded into the front side frames 21. Thus, the front side frames 21 each have a closed rectangular cross-sectional shape as viewed from a vehicle fore-and-aft direction.

The bumper beam 22 is a structural member disposed on the vehicle body front and extending in a vehicle width direction.

For example, a steel plate is molded into components by presswork, and the components are gathered and welded into the bumper beam 22 or the bumper beam 22 is made of an extruded material of aluminum alloy. Thus, the bumper beam 22 is a beam-shape member of a closed cross-sectional shape.

An intermediate portion of the bumper beam 22 is coupled to front ends of the left and right front side frames 21.

Both ends of the bumper beam 22 in the vehicle width direction protrude outward in the vehicle width direction from the front side frames 21.

The bumper beam 22 is a load transmission member by which a load that a center airbag 30C, a right airbag 30R, and a left airbag 30L, described later, receive from an object collided with is transmitted to a rear side of the vehicle body via the front side frames 21.

The front bumper 23 is an exterior member disposed on a front end of the vehicle body, and includes a bumper face that is made of a material such as PP resin and that constitutes a skin. The bumper face is attached to the vehicle body with brackets, not illustrated, for example.

A front surface of the front bumper 23 is curved in such a manner that the vehicle front is convex when the vehicle 1 is viewed from above.

The bumper beam 22 has such an arcuate shape that the vehicle front is convex along a curve of the front surface of the front bumper 23 when the vehicle 1 is viewed from above.

The airbag apparatus according to the embodiment includes the center airbag 30C, the right airbag 30R, and the left airbag 30L.

For example, each of the airbags is formed in a bag shape by bonding panels of base cloth such as nylon 66 woven fabric. When a pre-crash determination is established, the airbag is deployed by deployment gas generated by an inflator 111 and blown into the airbag.

The center airbag 30C is disposed on a center portion of the vehicle body in the vehicle width direction.

The right airbag 30R is disposed adjacently on a right side of the center airbag 30C in the vehicle width direction.

The left airbag 30L is disposed adjacently on a left side of the center airbag 30C in the vehicle width direction.

In normal operation (before a pre-crash determination is established), the center airbag 30C, the right airbag 30R, and the left airbag 30L in a folded state are attached to the bumper beam 22 and accommodated inside the front bumper 23.

Upon a collision, each of the airbags ruptures a fragile portion of the front bumper 23 and is unfolded forward of the vehicle and deployed forward of the front surface of the front bumper 23.

Figure 2:
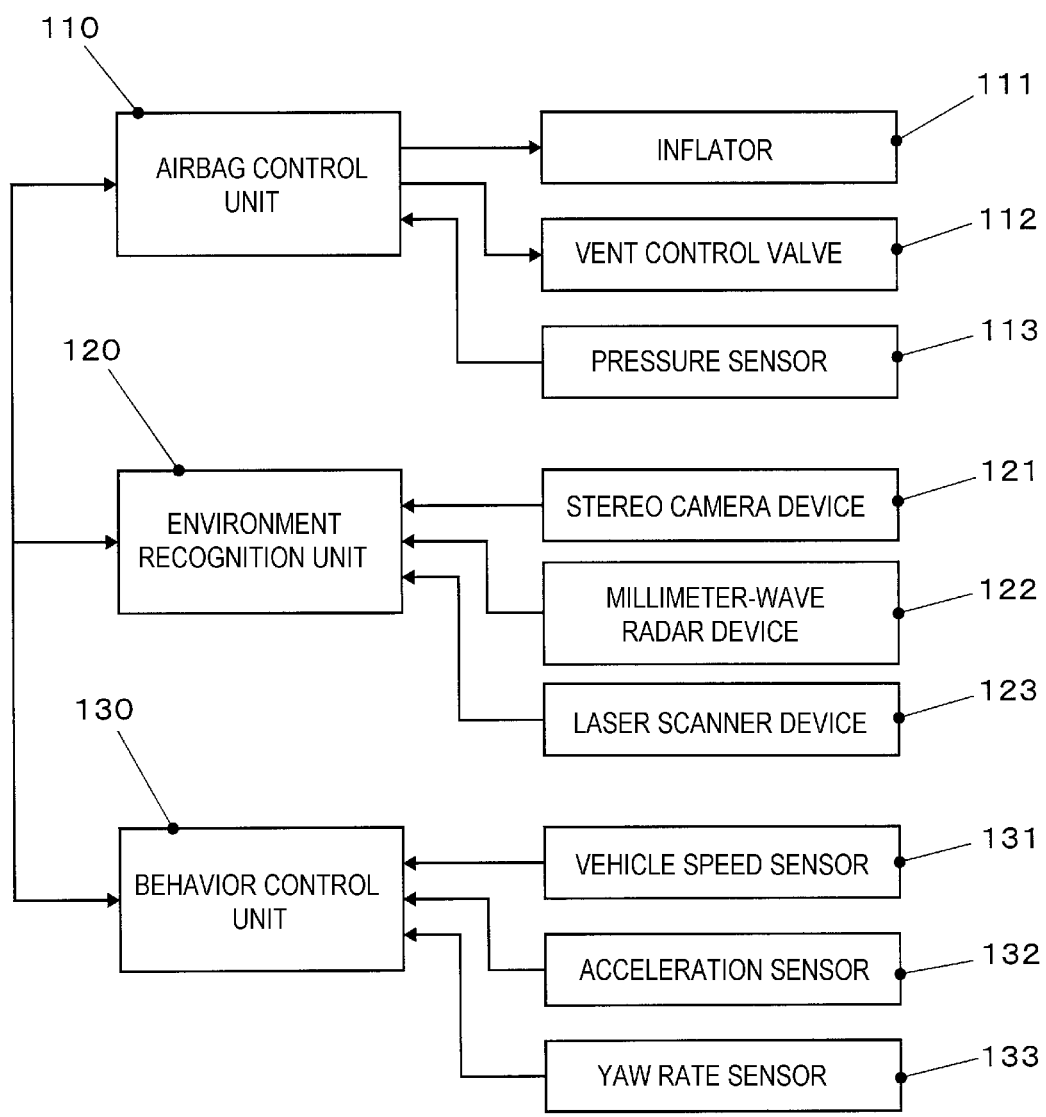
FIG. 2 is a block diagram schematically illustrating a configuration of a system to control the airbag apparatus according to the embodiment.

FIG. 2 is a block diagram schematically illustrating a configuration of a system to control the airbag apparatus according to the embodiment.

The system to control the airbag apparatus includes components such as the airbag control unit 110, an environment recognition unit 120, and a behavior control unit 130.

Each of these units may be provided as, for example, a microcomputer including an information processor such as a CPU, storages such as a RAM and a ROM, an input/output interface, and buses to couple these components to one another.

The units are connected via in-vehicle LAN such as a CAN communication system or directly and are mutually communicable.

The airbag control unit 110 commands and controls the inflators 111 and vent control valves 112 so as to deploy the center airbag 30C, the right airbag 30R, and the left airbag 30L and also to control a deployment state.

In one example, the airbag control unit 110 may serve as an "airbag deployment controller".

The airbag control unit 110 operates in conjunction with the vent control valves 112. In one example, the airbag control unit 110 may serve as an "airbag contraction controller".

The inflators 111 are chemical (explosive) gas generation devices to generate deployment gas to deploy the airbags in response to a command from the airbag control unit 110.

The inflators 111 are independently provided for the right airbag 30R, the center airbag 30C, and the left airbag 30L so that the inflators 111 can individually control whether to deploy and when to start deploying the right airbag 30R, the center airbag 30C, and the left airbag 30L.

The vent control valves 112 are respectively provided for the right airbag 30R, the center airbag 30C, and the left airbag 30L so as to open and close vent passages, not illustrated, to discharge gas out of the airbags (e.g., release gas to the atmosphere).

The vent control valves 112 serve, for example, to independently open and close the vent passages of the right airbag 30R, the center airbag 30C, and the left airbag 30L in response to a command from the airbag control unit 110.

The vent control valves 112 may each include an electromagnetic valve, for example.

The airbag control unit 110 is provided with pressure sensors 113.

The pressure sensors 113 serve to respectively detect internal pressures of the right airbag 30R, the center airbag 30C, and the left airbag 30L.

Based on outputs from the pressure sensors 113, the airbag control unit 110 can determine an input state of the load on the right airbag 30R, the center airbag 30C, and the left airbag 30L from another vehicle or the like.

The environment recognition unit 120 recognizes an environment around the host vehicle based on outputs from various sensors.

The environment recognition unit 120 serves to recognize, for example, various objects such as other vehicles, pedestrians, buildings, trees, and geographical features, and road shapes (lane shapes) in the vicinity of the vehicle 1 (host vehicle).

When a collision with an object such as another vehicle is unavoidable (when a collision probability is a predetermined value or higher), the environment recognition unit 120 establishes a pre-crash determination. In one example, the environment recognition unit 120 may serve as a "pre-crash determiner".

Components such as a stereo camera device 121, a millimeter-wave radar device 122, and a laser scanner device 123 are coupled to the environment recognition unit 120.

The stereo camera device 121 includes a pair of cameras disposed at a predetermined interval (base line length), and serves to recognize objects such as other vehicles, pedestrians, and bicyclists. The stereo camera device 121 also serves to detect a position of each of the objects relative to the vehicle 1 using known stereo image processing.

The stereo camera device 121 serves to recognize attributes of an object by, for example, pattern recognition of a captured image. For example, in the case of an object such as another vehicle, the stereo camera device 121 serves to recognize a size of the other vehicle (e.g., whether the other vehicle is a large-size vehicle, such as a truck, bus, and large-size SUV, which has a notably larger weight than the vehicle 1).

The millimeter-wave radar device 122 uses radio waves in a frequency band of 30 to 300 GHz, for example, and serves to detect presence of an object and a position of the object relative to the vehicle 1.

The laser scanner device (LiDAR) 123 irradiates and scans the vehicle 1 and its vicinity with a near-infrared laser beam in a pulse shape, for example. Based on presence of reflected light and time lags until the reflected light returns, the laser scanner device 123 serves to detect presence of an object, a position of the object relative to the vehicle 1, and a shape of the object.

When a collision with an object such as another vehicle is unavoidable (when a pre-crash determination is established), for example, the environment recognition unit 120 is capable of recognizing a collision form with the object (e.g., a speed vector of the object with respect to the vehicle 1, and a collision position relative to the vehicle 1), and attributes of the object (e.g., a model, a body shape, and a size in the case of a vehicle).

The behavior control unit 130 controls, for example, a braking force of each wheel by a hydraulic service brake device, not illustrated, and serves to perform control such as vehicle behavior control of preventing an oversteer behavior or an understeer behavior of the vehicle, and anti-lock brake control.

Components such as a vehicle speed sensor 131, an acceleration sensor 132, and a yaw rate sensor 133 are coupled to the behavior control unit 130.

The vehicle speed sensor 131 is disposed, for example, adjacently to a hub bearing that rotatably supports each of the wheels and outputs a vehicle speed signal of a frequency proportional to a rotational speed of the wheel.

The behavior control unit 130 serves to calculate a traveling speed (vehicle speed) of the vehicle based on the vehicle speed signal.

The acceleration sensor 132 detects, for example, a longitudinal acceleration and a lateral acceleration applied to the vehicle body.

The yaw rate sensor 133 detects a yaw rate of the vehicle body.

Next, an operation of the airbag apparatus according to the embodiment will be described.

Figure 3:
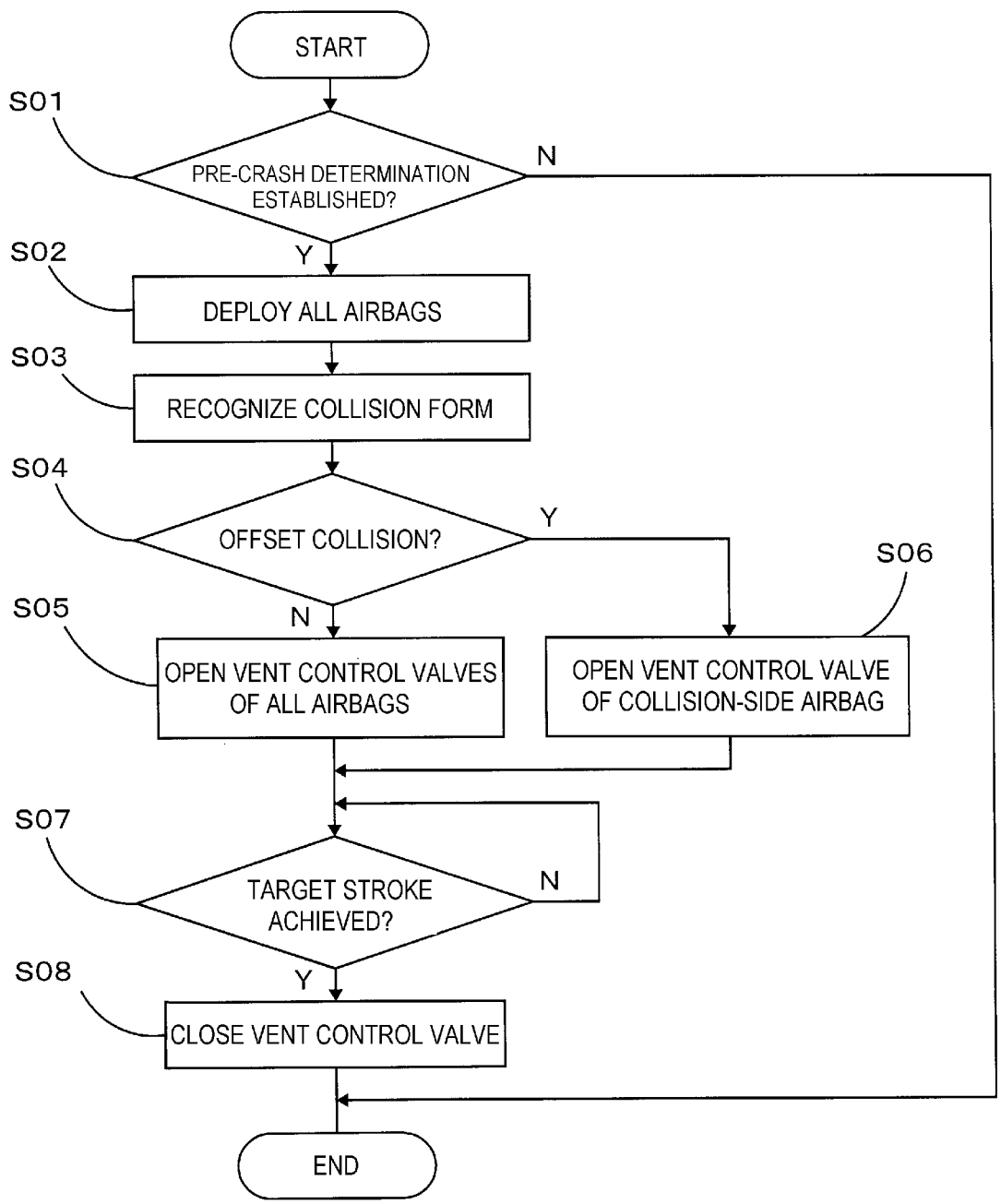
FIG. 3 is a flowchart of an operation of the airbag apparatus according to the embodiment in the event of a collision.

FIG. 3 is a flowchart of an operation of the airbag apparatus according to the embodiment in the event of a collision.

The operation will now be described step by step.

Step S01: Pre-crash Determination

Using known pre-crash determination logic, the environment recognition unit 120 estimates a probability of occurrence of a collision with another vehicle V approaching from ahead of the vehicle 1, and determines whether the estimated probability is equal to or higher than a preset threshold. In one example, the other vehicle may be referred to as an "object".

When the probability of occurrence of the collision is equal to or higher than the threshold, the environment recognition unit 120 regards the collision as unavoidable and establishes a pre-crash determination. Then, the process proceeds to step S02. Otherwise, the process ends (returns).

Step S02: Deployment of All Airbags

The airbag control unit 110 gives the inflators 111 an operational command to deploy the right airbag 30R, the center airbag 30C, and the left airbag 30L.

At this time, the vent passages of the airbags are closed by the respective vent control valves 112.

Then, the process proceeds to step S03.

Step S03: Collision Form Recognition

The airbag control unit 110 recognizes a collision form of the other vehicle with respect to the vehicle 1.

Recognition of the collision form may be performed based on, for example, internal pressures of the airbags that are detected by the pressure sensors 113.

For example, when an internal pressure of one of the airbags becomes higher than internal pressures of the other airbags, it may be recognized that the other vehicle has been in contact with the one of the airbags. In particular, when an internal pressure increase of one of the right airbag 30R and the left airbag 30L is larger than an internal pressure increase of the center airbag 30C and also when the other of the right airbag 30R and the left airbag 30L exhibits no notable change in internal pressure, it may be recognized that an offset collision has occurred in which the other vehicle, for example, mainly collides with the one of the right airbag 30R and the left airbag 30L.

Instead of recognizing a collision form using such pressure sensors 113, the airbag control unit 110 may recognize a collision form based on the outputs from the environment recognition unit 120 and the behavior control unit 130.

For example, positions of the other vehicle relative to the vehicle 1 before and after the collision may be monitored by components such as the stereo camera device 121, and a collision form such as an offset collision may be determined based on a monitoring result.

A collision form such as an offset collision may be determined based on a vehicle body behavior detected by the acceleration sensor 132 and the yaw rate sensor 133.

Then, the process proceeds to step S04.

Step S04: Offset Collision Determination

The airbag control unit 110 determines whether the collision form recognized at step S03 is a specific offset collision in such a form that collision damage can be prevented by side airbag contraction control, described later.

For example, when an overlap ratio of the other vehicle with respect to the vehicle 1 is equal to or less than a predetermined value, and when the other vehicle collides in a predetermined angle range while the other vehicle is in contact with the center airbag 30C and one of the right airbag 30R and the left airbag 30L, the collision form may be determined as the specific offset collision.

Such a determination may be made based on, for example, the outputs from the pressure sensors 113 and the environment recognition unit 120.

It is noted that in this specification and the claims, the offset collision includes a diagonal offset collision (so-called oblique collision) in which an object such as another vehicle collides with a host vehicle along a direction inclined with respect to a fore-and-aft direction of the host vehicle.

When the collision form is determined as the specific offset collision, the process proceeds to step S06. Otherwise (e.g., in the case of a full wrap frontal collision and an offset collision with an overlap ratio outside the predetermined range), the process proceeds to step S05.

Step S05: Opening of Vent Control Valves of All Airbags

The airbag control unit 110 gives the vent control valves 112 a command to open the vent passages of all of the right airbag 30R, the center airbag 30C, and the left airbag 30L.

Thus, in the case of a full wrap frontal collision, for example, all of the airbags are contracted by discharging gas therefrom in accordance with progress of the collision so as to increase energy absorption implementable by the airbag apparatus.

Then, the process proceeds to step S07.

Step S06: Opening of Vent Control Valve of Collision-Side Airbag

The airbag control unit 110 performs the side airbag contraction control of giving the vent control valves 112 a command to open the vent passage of one of the right airbag 30R and the left airbag 30L where the other vehicle is colliding, so as to contract the airbag by discharging gas therefrom.

Then, the process proceeds to step S07.

Step S07: Target Stroke Achievement Determination

The airbag control unit 110 determines whether the airbag with the vent passage that has been opened at step S05 or step S06 discharges gas in response to the input from the other vehicle and is contracted to have a dimension in the fore-and-aft direction decreased by a predetermined target stroke (impact absorption stroke).

The target stroke may be set at a large value in accordance with, for example, an increase in size of the other vehicle (an increase in estimated weight of the other vehicle) that has been recognized by the environment recognition unit 120.

The target stroke may be set at a large value in accordance with, for example, an increase in relative speed of the vehicle 1 and the other vehicle that has been recognized by the environment recognition unit 120.

This can increase an amount of energy absorption by each of the airbags when the collision energy is large.

When the airbag with the vent passage opened is contracted by the target stroke, the process proceeds to step S08, and otherwise repeats step S07.

It is noted that a determination as to whether contraction for the target stroke is achieved is based on elapsed time from opening of the vent passage, for example. In one example, when the elapsed time from opening of the vent passage reaches predetermined time, it is determined that contraction for the target stroke has been achieved.

The determination as to whether contraction for the target stroke is achieved may be based on a position of the other vehicle that is detected by the environment recognition unit 120. In one example, when the position of the other vehicle that is detected by the environment recognition unit 120 approaches a position at a predetermined distance to the host vehicle, it is determined that contraction for the target stroke has been achieved. When the position of the other vehicle that is detected by the environment recognition unit 120 is displaced (approaches the host vehicle) by a predetermined displacement amount from a position of the other vehicle upon the collision or a front end position of the airbag when the airbag is fully deployed, it may be determined that contraction for the target stroke has been achieved.

The vent passage may be provided with a flow rate sensor to detect a flow rate of gas. When the flow rate of the gas that has passed through the vent passage reaches a predetermined flow rate, it may be determined that contraction for the target stroke has been achieved.

Therefore, a dimension of the target stroke may be changed by adjusting the predetermined time, the predetermined displacement amount, and the predetermined flow rate described above.

Step S08: Closing of Vent Control Valve

The airbag control unit 110 gives the vent control valves 112 a command to close the vent passage that has been opened at step S05 or step S06.

Thus, while maintaining the present shape and volume, each of the airbags transmits the input from the other vehicle to the bumper beam 22.

Then, the process ends.

In the embodiment, as described above, when the environment recognition unit 120 establishes the pre-crash determination, all of the right airbag 30R, the center airbag 30C, and the left airbag 30L are first deployed as illustrated in FIG. 1.

Figure 4:
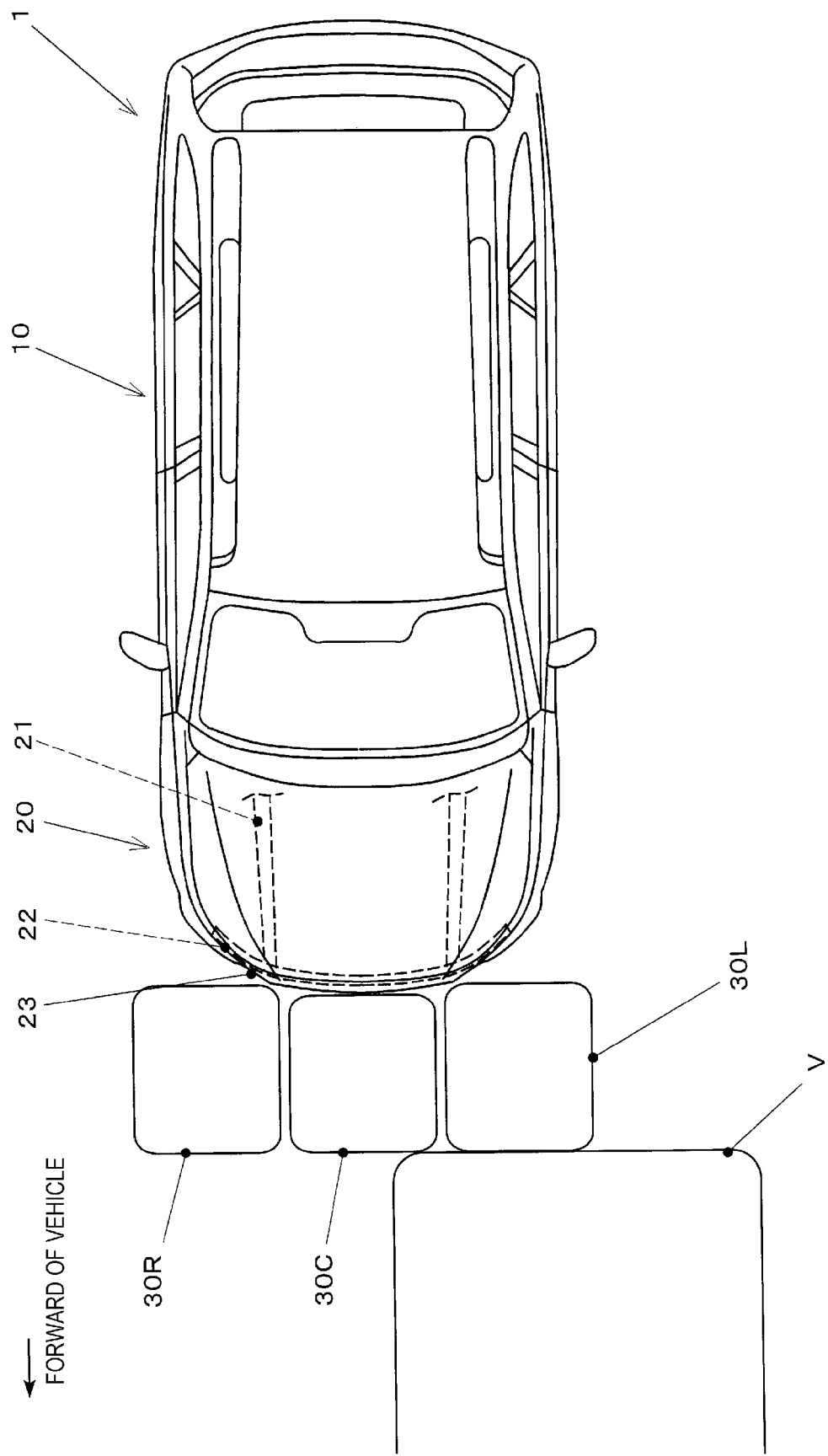
FIG. 4 is a diagram schematically illustrating a state immediately after a vehicle including the airbag apparatus according to the embodiment has collided with another vehicle.

FIG. 4 is a diagram schematically illustrating a state immediately after a vehicle including the airbag apparatus according to the embodiment has collided with another vehicle.

In an example illustrated in FIG. 4, while another vehicle V is in contact with the left airbag 30L and the center airbag 30C from ahead of the vehicle 1, the other vehicle V is colliding with the vehicle 1 at an overlap ratio equal to or less than the predetermined value. This is the specific offset collision (a collision where damage can be prevented by the side airbag contraction control).

In this case, the airbag control unit 110 performs the side airbag contraction control of giving the vent control valves 112 a command to open the vent passage of the left airbag 30L while maintaining the vent passages of the center airbag 30C and the right airbag 30R in closed states.

FIG. 5 is a diagram illustrating a state after the vehicle including the airbag apparatus according to the embodiment has collided with the other vehicle and performed side airbag contraction control.

The left airbag 30L has the vent passage opened and starts contracting whereas the center airbag 30C is kept deployed. Consequently, reaction forces from the center airbag 30C and the left airbag 30L have imbalance, and front surfaces of the center airbag 30C and the left airbag 30L have a positional difference in the vehicle fore-and-aft direction (an inclination with respect to the vehicle width direction). Thus, while sliding on the front surfaces of the airbags, the other vehicle V turns to the left in the vehicle width direction as viewed from the vehicle 1.

As a reaction to causing the reaction forces of the airbags to turn the other vehicle V, the vehicle 1 turns to circle to the right in the vehicle width direction.

This can convert collision energy upon the collision of the other vehicle V with the vehicle 1 into kinetic energy to turn the vehicles in such directions that the vehicles swerve from each other and pass by (as indicated by dashed-line arrows in FIG. 5). Thus, the other vehicle V can be made to turn aside from the vehicle 1 so as to prevent collision damage to the vehicle 1 and the other vehicle V.

As has been described heretofore, this embodiment can produce the following effects.

1. Upon an offset collision where the other vehicle V collides with some of the plurality of airbags 30R, 30C, and 30L disposed on the vehicle body front of the vehicle 1, the side airbag contraction control is performed as follows: contracting one of the airbags in a region where the collision with the other vehicle V is occurring, the one of the airbags being on one side in the vehicle width direction (the left airbag 30L in the example illustrated in FIGS. 4 and 5); and keeping deployed the other of the airbags in the region (the center airbag 30C in the example illustrated in FIGS. 4 and 5). Thus, collision energy can be absorbed by the airbag contracted. Also, due to the reaction force exerted on the object by the airbag kept deployed next to the airbag contracted and the positional difference (inclination) of the front surfaces of the airbags in the vehicle fore-and-aft direction, the other vehicle V is guided and turned outward of the vehicle 1 in the vehicle width direction. This can convert the collision energy of the other vehicle V into kinetic energy and reduce an absorption amount of the collision energy by the vehicle body structure of the vehicle 1 so as to prevent damage.

As a result, in a collision with a large-size vehicle or a vehicle at a high relative speed or a multiple collision, for example, excessive collision energy can be prevented from being input to the vehicle body structure and collapsing the vehicle cabin so that a survival space can be secured to reduce injuriousness to an occupant.

2. In the side airbag contraction control, after the airbag that has started contracting contracts by the predetermined stroke, contraction of the airbag of interest is prevented. Thus, after intended energy absorption is performed, conversion of remaining collision energy into kinetic energy can be promoted to obtain the above-described effects appropriately.

3. In accordance with an increase in size of the other vehicle V, which is an object collided with, and an increase in speed of the other vehicle V relative to the vehicle 1, the contraction stroke (impact absorption stroke) of the airbag by the side airbag contraction control is increased so that excessive energy can be prevented from being input to the vehicle body structure and damaging the vehicle body.

4. Each of the airbags includes the vent control valve 112 to open and close the vent passage to discharge internal gas out of the airbag. The vent control valve 112 opens the vent passage to contract the airbag so that a deployment state of the airbag can be controlled by a simple configuration with high responsiveness.

Modifications

The disclosure is not to be limited to the above-described embodiment but may be modified in various manners. Such modifications will also fall within the technical scope of the disclosure.

1. The configurations of the airbag apparatus and the vehicle are not to be limited to those of the above-described embodiment but may be modified as suited.

For example, a configuration, shape, material, manufacturing method, location, and the number of each kind of components that constitute the airbag apparatus and the vehicle, and details of various kinds of control are not to be limited to those of the embodiment but may be modified as suited.

2. A method of performing a pre-crash determination and a method of determining a collision form are not to be limited to those in the above-described embodiment but may be modified as suited.

3. In the embodiment, as an example, the three airbags are disposed in the vehicle width direction. However, this is not to be construed in a limiting sense. For example, four airbags or more may be disposed.

4. In the embodiment, the target stroke in the side airbag contraction control is set in accordance with a size and a relative speed of an object collided with. However, this is not to be construed in a limiting sense. The target stroke may be set based on other information. For example, when the object is another vehicle, and when a vehicle model may be determined by a method such as image recognition, a weight of the other vehicle may be estimated, and the target stroke may be set in accordance with the estimated weight.

5. In the embodiment, the target stroke is set, and the airbag ends contracting when contraction for the target stroke is achieved. However, instead of this, when predetermined time elapses after a venting start, for example, the airbag may end contracting.

According to the embodiment of the disclosure, upon an offset collision where the object collides with some of the plurality of airbags disposed on the front of the host vehicle, one of the airbags in a region where the collision with the object is occurring is contracted. The one of the airbags is on one side in the vehicle width direction. Also, the other of the airbags in the region is kept deployed. Thus, collision energy can be absorbed by the airbag contracted. Moreover, due to the reaction force exerted on the object by the airbag kept deployed next to the airbag contracted and the inclination formed by the positional difference of the front surfaces of the airbags in the vehicle fore-and-aft direction, the object is guided to turn outward of the host vehicle in the vehicle width direction. This can convert the collision energy of the object into kinetic energy and reduce an absorption amount of the collision energy by the host vehicle so as to prevent damage.

Moreover, the airbag is contracted by the predetermined stroke to absorb intended energy, and contraction of the airbag is then prevented to promote conversion of remaining collision energy into kinetic energy. Thus, the above-described effects can be obtained appropriately.

Consequently, the stroke is set in accordance with, for example, a magnitude and a direction of collision energy received from the object so that control can be performed in a manner suitable for a collision form and a kind of the object.

When it is presumed that a large weight and a high relative speed of the object increase the collision energy, the target stroke is increased to promote energy absorption by the airbag contraction. Thus, excessive energy can be prevented from being input to the vehicle body structure so as to reduce damage to the vehicle body.

Furthermore, a deployment state of the airbag can be controlled by a simple configuration with high responsiveness so that the above-described effects can be obtained appropriately.

As described above, according to the embodiment of the disclosure, it is possible to provide the airbag apparatus that can prevent damage during a collision with an object.

The airbag control unit 110, the environment recognition unit 120, and the behavior control unit 130 in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airbag control unit 110, the environment recognition unit 120, and the behavior control unit 130 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airbag control unit 110, the environment recognition unit 120, and the behavior control unit 130 in FIG. 2.

The invention claimed is:

1. An airbag apparatus to be applied to a vehicle, the airbag apparatus comprising:
   airbags configured to be deployed forward of a vehicle body front of the vehicle, the airbags being disposed in a vehicle width direction;
   a pre-crash determiner configured to establish a pre-crash determination in a case where a probability of a collision with an object is equal to or higher than a predetermined value;
   an airbag deployment controller configured to deploy the airbags in response to establishment of the pre-crash determination; and
   an airbag contraction controller configured to control contraction of the airbags individually, the airbag contraction controller being configured to perform side airbag contraction control by: contracting one of the airbags in a region where the collision with the object is occurring, the one of the airbags being on one side in the vehicle width direction; and keeping deployed another one or more of the airbags in the region.

2. The airbag apparatus according to claim 1, wherein the airbag contraction controller is configured to, after the one of the airbags is contracted by a predetermined target stroke, prevent contraction of the one of the airbags.

3. The airbag apparatus according to claim 2,
   wherein the pre-crash determiner is configured to determine a collision form of the object with the vehicle and an attribute of the object, and
   wherein the airbag contraction controller is configured to set the target stroke based on the collision form and the attribute of the object.

4. The airbag apparatus according to claim 3, wherein the airbag contraction controller is configured to increase the target stroke in accordance with at least one of a size increase of the object or a speed increase of the object relative to the vehicle.

5. The airbag apparatus according to claim 1,
   wherein each of the airbags comprises
      a vent passage configured to discharge internal gas, and
      a vent controller configured to open and close the vent passage, and
   wherein the airbag contraction controller is configured to contract the airbag by causing the vent controller to open the vent passage.

6. The airbag apparatus according to claim 2,
   wherein each of the airbags comprises
      a vent passage configured to discharge internal gas, and
      a vent controller configured to open and close the vent passage, and
   wherein the airbag contraction controller is configured to contract the airbag by causing the vent controller to open the vent passage.

7. The airbag apparatus according to claim 3,
   wherein each of the airbags comprises
      a vent passage configured to discharge internal gas, and
      a vent controller configured to open and close the vent passage, and
   wherein the airbag contraction controller is configured to contract the airbag by causing the vent controller to open the vent passage.

8. The airbag apparatus according to claim 4,
   wherein each of the airbags comprises
      a vent passage configured to discharge internal gas, and
      a vent controller configured to open and close the vent passage, and
   wherein the airbag contraction controller is configured to contract the airbag by causing the vent controller to open the vent passage.

9. An airbag apparatus to be applied to a vehicle, the airbag apparatus comprising:
   airbags configured to be deployed forward of a vehicle body front of the vehicle, the airbags being disposed in a vehicle width direction; and
   circuitry configured to
      establish a pre-crash determination in a case where a probability of a collision with an object is equal to or higher than a predetermined value,
      deploy the airbags in response to establishment of the pre-crash determination,
      control contraction of the airbags individually, and
      perform side airbag contraction control by: contracting one of the airbags in a region where the collision with the object is occurring, the one of the airbags being on one side in the vehicle width direction; and keeping deployed another one or more of the airbags in the region.

* * * * *